United States Patent [19]
Mueller

[11] Patent Number: 5,640,882
[45] Date of Patent: Jun. 24, 1997

[54] INDIRECT MANUAL TRANSMISSION FOR MOTOR VEHICLES HAVING CROSS-COUNTRY

[75] Inventor: Robert Mueller, Moensheim, Germany

[73] Assignee: Dr. Ing. h.c.F. Porsche AG, Weissach, Germany

[21] Appl. No.: 444,099

[22] Filed: May 18, 1995

[30] Foreign Application Priority Data

May 18, 1994 [DE] Germany ............... 44 17 372.5

[51] Int. Cl.$^6$ ............................................. F16H 3/08
[52] U.S. Cl. ........................... 74/359; 74/333; 74/360
[58] Field of Search ............... 74/333, 330, 360, 74/359

[56] References Cited

U.S. PATENT DOCUMENTS

| | | | |
|---|---|---|---|
| 3,675,508 | 7/1972 | Blank | 74/359 |
| 4,674,358 | 6/1987 | Nishimura | 74/360 |
| 4,686,869 | 8/1987 | Beim | 74/360 |

FOREIGN PATENT DOCUMENTS

| | | |
|---|---|---|
| 545514 | 7/1985 | Australia. |
| 1580101 | 10/1970 | Germany. |
| 2941062 | 5/1980 | Germany. |
| 2937143 | 5/1980 | Germany. |
| 3006811 | 10/1981 | Germany. |
| 3428451 | 2/1985 | Germany. |
| 3835224 | 4/1990 | Germany. |

OTHER PUBLICATIONS

Patent Abstract of Japanese No. 54–140949, vol. 6, No. 242 (M–175) (1120), Nov. 30, 1982.

Primary Examiner—Charles A. Marmor
Assistant Examiner—Sherry Lynn Estremsky
Attorney, Agent, or Firm—Evenson, McKeown, Edwards & Lenahan, P.L.L.C.

[57] ABSTRACT

An indirect manual transmission for a motor vehicle having cross-country mobility includes a cross-country reduction stage connected behind the transmission unit. At least one control gear wheel constructed as a loose wheel is provided on its input shaft. This control gear wheel is constructed as a twin gear wheel and is used as a countershaft for the reduction stage. With this coaxial arrangement of the countershaft, the indirect manual transmission has a particularly compact construction.

9 Claims, 3 Drawing Sheets

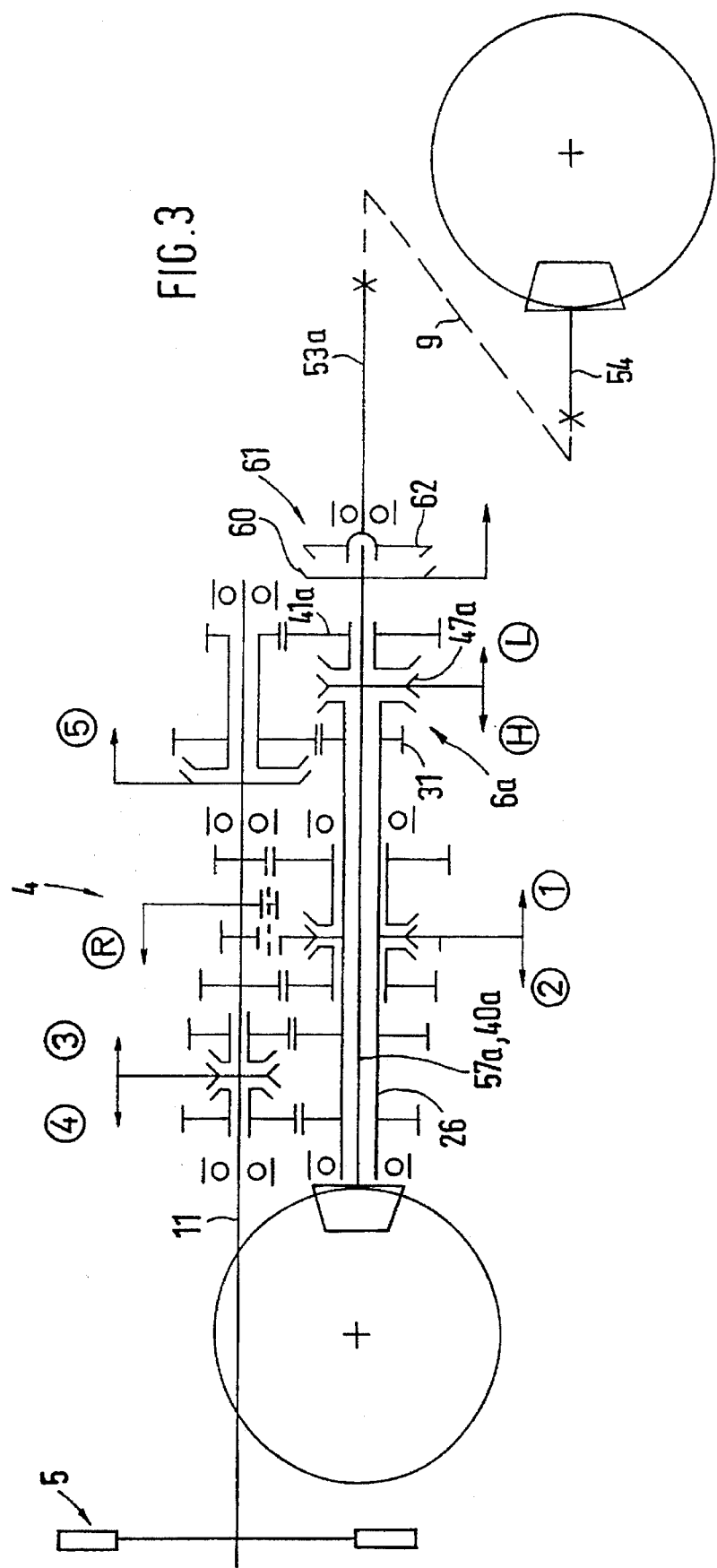

INDIRECT MANUAL TRANSMISSION FOR MOTOR VEHICLES HAVING CROSS-COUNTRY

BACKGROUND AND SUMMARY OF THE INVENTION

This invention is based on an indirect manual transmission for motorcycles having cross-country mobility and, more particularly to an indirect manual transmission for a motor vehicle including an input shaft and a secondary shaft which is driven by this input shaft and whose gear wheels are disposed as loose wheels on the respective shaft partially in a non-rotatable and partially in a rotatable manner, and also including a shiftable cross-country reduction stage which is connected behind and which is integrated in the transmission unit.

From German Patent document DE 30 06 811 A1, a manual transmission for motor vehicles is known. The manual transmission is constructed as an indirect manual transmission with an input shaft, which is arranged in parallel, and with a secondary shaft. In this case, the gear wheels of the input shaft are non-rotatably connected with the shaft, while the gear wheels of the secondary shaft are rotatably disposed on this secondary shaft as loose wheels or control gears and can be shifted into a non-rotatable connection by way of shift dogs. A reduction stage or reduction gear is connected behind the manual transmission. The countershaft of this reduction gear is arranged in parallel to the secondary shaft of the transmission. The shifting of the two stages of the reduction gear takes place by way of a shift dog arranged on the countershaft. As a result of such an arrangement of the reduction gear or of the reduction stage, the manual transmission becomes relatively wide. In addition, this type of an arrangement of three parallel shafts requires considerable bearing expenditures.

From German Patent document DE 34 28 451 A1, an indirect manual transmission is known in the case of which the reduction gear or the reduction stage is constructed as a front-mounted splitter unit on the input side of the manual transmission. This front-mounted reduction gear has two transmission ranges; one transmission range for high speeds and one transmission range for low speeds. In this case, the transmission range for high speeds can be shifted by way of a hydraulic clutch, while the transmission range for the low speed can be shifted by way of a one-way clutch.

There is therefore needed an indirect manual transmission for vehicles having cross-country mobility constructed in such a manner that this manual transmission has a compact construction, while allowing the main transmission as well as the reduction gear to be shifted in an easy manner.

These needs are met according to the present invention by an indirect manual transmission for a motor vehicle including an input shaft and a secondary shaft which is driven by this input shaft and whose gear wheels are disposed as loose wheels on the respective shaft partially in a non-rotatable and partially in a rotatable manner, and also including a shiftable cross-country reduction stage which is connected behind and which is integrated in the transmission unit. A loose wheel of the input shaft is constructed as a twin gear wheel and can be operated as a countershaft of the cross-country reduction stage.

If, in the case of an indirect manual transmission, one of the loose wheels on the input shaft is constructed as a twin wheel, this twin wheel can be utilized as a countershaft for the reduction gear. This permits a coaxial arrangement of the reduction gear so that the size of the transmission (cross-section perpendicular to the longitudinal axis of the transmission) does not increase or only insignificantly increases with respect to a manual transmission without any reduction stage. At the same time, in comparison to a conventional manual transmission with a rear-mounted reduction stage, this type of a transmission is shorter and is only slightly longer than a manual transmission without a reduction stage because the additional length is minimized by the "double utilization" of a loose wheel of the manual transmission. In this case, the shifting of the reduction stage may take place using a conventional gear shift sleeve. A synchronization of the shifting operation is easily made possible.

In an advantageous embodiment of the invention, the loose wheel constructed as a twin gear wheel is assigned to one of the upper speeds of the manual transmission, particularly to the highest speed. This results in favorable circumferential dimensions for the reduction stage. Further, the rotational speeds and torques occurring during the operation can be controlled without requiring an increase in the gear wheel width of the corresponding loose wheel beyond the conventional measurements. In contrast to the gear wheels of the lower speeds, the gear wheels of the upper or of the highest speed are designed for high continuous loads which also permits a continuous operation of the reduction stage without any excessive widening of the gear wheel.

An indirect manual transmission which is constructed in this manner is particularly suitable for installation in a longitudinal direction of the motor vehicle in conjunction with an engine which is also mounted in the longitudinal direction. This engine can be arranged in front of the front axle of the motor vehicle and therefore permits a relatively low height for the engine compartment. In this case, the transmission can advantageously be arranged in the area of the front axle so that a front wheel drive can be driven directly in the area of the transmission.

For the all-wheel drive of the motor vehicle, the transmission can very advantageously have a very compact construction if the pinion shaft of one of the axle drives (particularly of the front axle drive) is guided in the secondary shaft of the transmission constructed as a hollow shaft.

If the output shaft of the reduction gear or of the reduction stage is constructed as a hollow shaft through whose bore the pinion shaft of an axle drive (particularly of the front axle drive) is guided, an all-wheel drive can be represented in a particularly compact construction without an excessive increase in the length and the circumference of the transmission. For the all-wheel drive of the motor vehicle, it is advantageous to provide a center differential with a coaxial output to the front and the rear axle in the power flux behind the reduction gear. This center differential can advantageously be integrated in the transmission case. It may be constructed, for example, as a self-locking differential of the torsen construction, as a multi-disk limited-slip differential or as a visco-clutch.

The overall length of the indirect manual transmission may be again shortened if a connection clutch is arranged instead of the center differential in the power flux behind the reduction gear, by means of which connection clutch one of the two axle drives can be connected to a permanently driven axle drive.

Other objects, advantages and novel features of the present invention will become apparent from the following detailed description of the invention when considered in conjunction with the accompanying drawings.

BRIEF DESCRIPTION OF THE DRAWINGS

FIG. 3 is a schematic diagram of the indirect manual transmission according to the present invention with a connection clutch connected behind it.

DETAILED DESCRIPTION OF THE DRAWINGS

Figure 1:
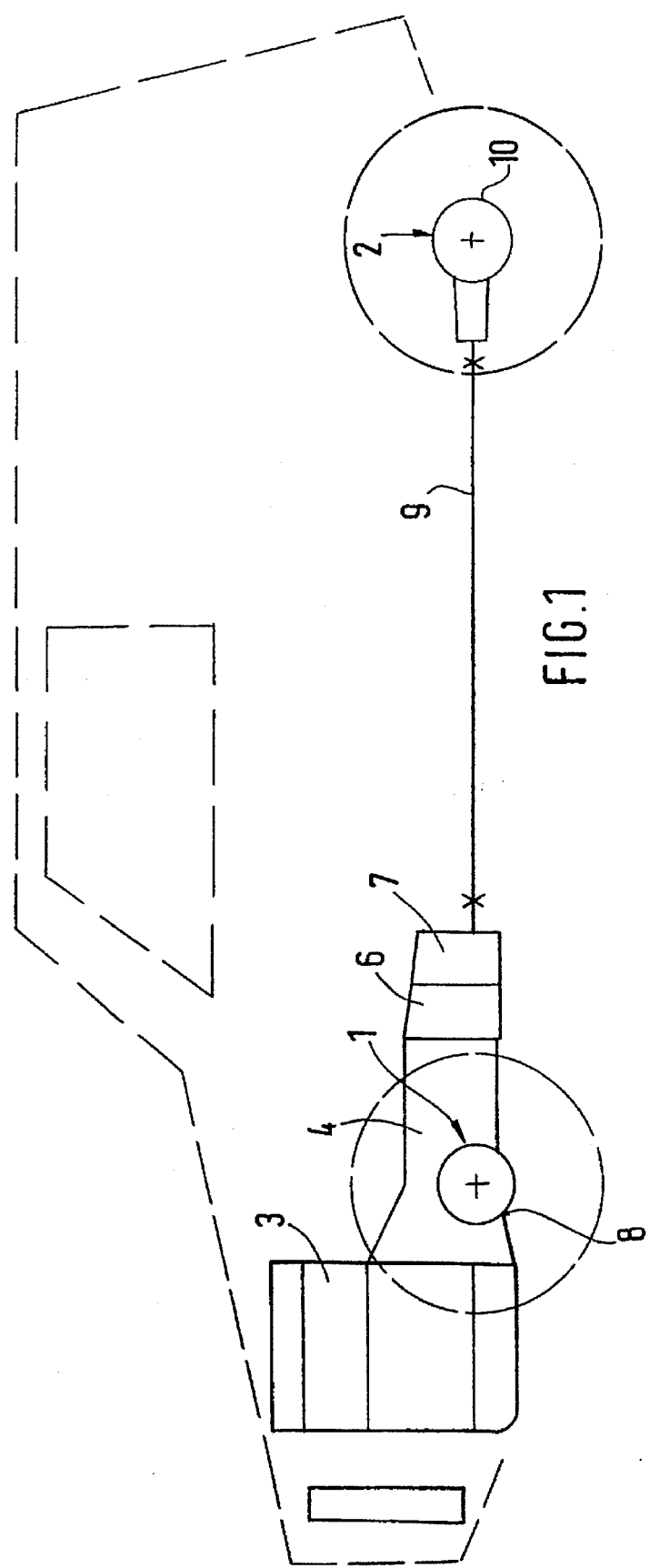
FIG. 1 is a very simplified schematic diagram of a motor vehicle with an all-wheel drive and a schematically illustrated transmission line.
Figure 2:
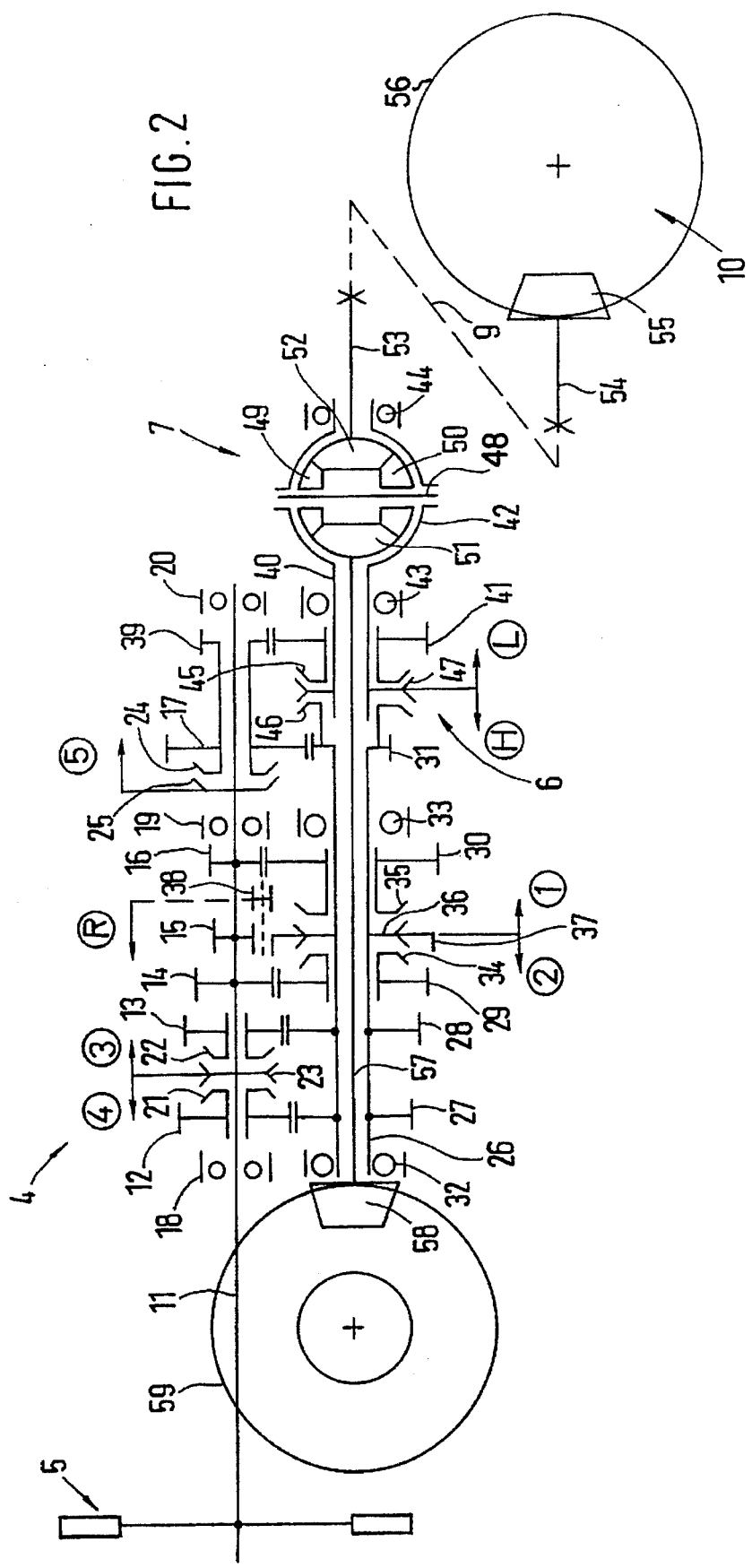
FIG. 2 is a schematic diagram of the indirect manual transmission according to the present invention with a transfer transmission connected behind it.

In a motor vehicle having a drivable front axle 1 and also a drivable rear axle 2, an engine 3 is arranged in the longitudinal direction, that is, having shafts arranged in parallel to the driving direction, in front of the front axle 1. A manual transmission 4, which is also oriented in the longitudinal direction, is flanged to the engine 3 by means of a clutch 5 (FIGS. 2, 3). This manual transmission 4 is adjoined by a reduction gear 6 behind which a transfer transmission 7 is connected. This transfer transmission 7 drives the front axle differential 8 arranged in the area of the transmission 4 and, by way of a cardan shaft 9, the rear axle differential 10 arranged on the rear axle 2.

The input shaft 11 of the transmission 4 is connected with the engine 3 so that it can be separated from the engine by way of the clutch 5. The loose wheel 12 or the control gear wheel of the 4th gear, the loose wheel 13 of the 3rd gear, the fixed wheel 14 of the 2nd gear, the fixed wheel 15 of the reverse gear, the fixed wheel 16 of the 1st gear and the loose wheel 17 of the 5th gear are arranged behind one another on the input shaft 11. In this embodiment, the bearing of the input shaft 11 takes place at three bearing points; at a first bearing point 18 in front of the loose wheel 12 of the 4th gear; at a second bearing point 19 between the fixed wheel 16 of the 1st gear and the loose wheel 17 of the 5th gear; and at a third bearing point 20 at the end of the input shaft 11 behind the loose wheel 17. The mutually facing sides of the loose wheels 12, 13 of the 4th and 3rd gear are each provided with a shifting cone 21, 22 between which a synchronizing gear shift sleeve 23 is arranged. The gear shift sleeve 23 is non-rotatably but axially displaceably connected with the input shaft 11. By means of the axial displacement of the shift sleeve 23, in a manner known per se, one of the two loose wheels 12, 13 can be non-rotatably connected with the input shaft 11. On its side facing the second bearing point 19, the loose wheel 17 of the 5th gear is provided with a shifting cone 24 which interacts with a synchronizing shift sleeve 25 non-rotatably connected with the input shaft. This shift sleeve 25 is disposed in an axially displaceable manner on the input shaft 11 so that the loose wheel 17 of the 5th gear can be shifted in a manner known per se by means of the axial displacement.

In parallel to the input shaft 11, a driven secondary shaft 26 is disposed in the transmission 4. The fixed wheel 27 of the 4th gear, the fixed wheel 28 of the 3rd gear, the loose wheel 29 of the 2nd gear, the loose wheel 30 of the 1st gear, and the fixed wheel 31 of the 5th gear are arranged behind one another on the secondary shaft 26. The fixed wheels 27, 28 of the 4th and 3rd gear, the loose wheels 29, 30 of the 2nd and 1st gear as well as the fixed wheel 31 of the 5th gear are in a continuously meshing engagement with the corresponding opposite gear wheels on the input shaft 11. The bearing of the secondary shaft 26 takes place at two bearing points—a first bearing point 32 in front of the fixed wheel 27 of the 4th gear and a second bearing point 33 behind the loose wheel 30 of the 1st gear. On the mutually facing faces of the loose wheels 29, 30 of the 2nd and 1st gear, one shifting cone 34, 35 respectively is constructed. In a manner known per se, these shifting cones 34, 35 interact with a synchronizing shift sleeve 36 which is connected non-rotatably, but in an axially displaceable manner, with the secondary shaft. This shift sleeve 36 is provided with an external toothing 37 and is arranged such that this external toothing 37 is situated opposite the fixed wheel 15 of the reverse gear. The external toothing 37 and the toothing of the reverse gear fixed wheel 15 are arranged at a distance from one another and may be meshingly engaged with an axially displaceable reversing gear wheel 38.

The loose wheel 17 of the 5th gear, which is rotatably disposed on the input shaft 11, is constructed as a twin gear wheel and has a second reduction gear wheel 39 which faces the third bearing point 20. This reduction gear wheel 39 is in a continuously meshing engagement with a opposite gear wheel 41 which, as a loose wheel, is rotatably disposed on the output shaft 40 of the reduction gear 6. The output shaft 40 of the reduction gear 6 is aligned with the secondary shaft 26 and is connected with the case 42 of the transfer transmission 7. The transfer transmission 7 is constructed as a center differential. The bearing of the output shaft 40 takes place at two bearing points 43, 44 on both sides of the differential gear 7. On its face facing the secondary shaft 26, the opposite gear wheel 41 is provided with a shifting cone 45. A shifting cone 46, which is connected with the fixed wheel 31 of the 5th gear of the secondary shaft 20, is disposed opposite the shifting cone 45. A synchronizing shift sleeve 47 is connected in-between which is connected with the output shaft 40 in a non-rotatable but axially displaceable manner and which, by means of an axial displacement, can be coupled either with shifting cone 46 of the 5th gear or with the shifting cone 45 of the opposite gear wheel 41.

The transfer transmission 7 is constructed as a center differential which is known per se. In the case 42 of the differential gear 7, an axle bolt 48 extends. The axle bolt 48 has two bevel gears 49, 50. These two bevel gears 49, 50 engage with two differential bevel gears 51, 52 which are connected with the front axle differential 8 or with the rear axle differential 10. For this purpose, the differential bevel gear 52 is connected with a connection shaft 53 which, by way of the cardan shaft 9, is connected with a pinion shaft 54 of the rear axle differential 10. On the free end of this pinion shaft 54, a bevel gear 55 is arranged which meshes with the ring gear 56 of the rear axle differential 10 (not shown in detail). The second differential bevel gear 51 is connected with the opposite pinion shaft 57 of the front axle differential 8. On the free end of the pinion shaft 57, a bevel gear 58 is arranged which meshes with the ring gear 59 of the front axle differential 8 which is not shown in detail. The pinion shaft 57 is guided or disposed in the secondary shaft 26 and in the output shaft 40 which is aligned with the secondary shaft 26, which, for this purpose, are each constructed as hollow shafts.

As a result of the construction of the loose wheel 17 of the 5th gear as a twin gear wheel which, on the one hand, meshes with the fixed wheel 31 of the 5th gear and, on the other hand, with the opposite gear wheel 41, the loose wheel 17 is used as a countershaft for the reduction transmission 6 and is disposed on the input shaft in a space-saving manner. The shifting of the reduction gear takes place through the shift sleeve 47. By the displacement of the shift sleeve 47 to the left (FIG. 2) in shift position H (high or fast gear), the secondary shaft 26 and the output shaft 40 of the reduction gear 6 are connected with one another directly by way of the shifting cone 46 of the fixed wheel 31. The shifting of the transmission 4 takes place analogously to the shifting of conventional transmissions without any reduction stage and does not have to be explained here in detail. By the displacement of the shift sleeve 47 toward the right in shift position L (low or slow/cross-country gear), this shift sleeve 47 is non-rotatably connected with the shifting cone 45 of the opposite gear wheel 41. In this case, the power flux in the reduction gear 6, in gears 1 to 4 and in the reverse gear of the transmission 4 takes place by way of the secondary shaft 26 and the fixed wheel 31 of the 5th gear to the loose wheel 17 on the input shaft 11 which serves as the countershaft.

As a result of the construction as a twin gear wheel, the power flux travels by way of the reduction gear wheel 39 and the corresponding meshing opposite gear wheel 41, its shifting cone 45 and the shift sleeve 47, to the output shaft 40. In the 5th gear of the transmission 4, that is, when the shift sleeve 25 is shifted, the power flux travels from the input shaft 11 by way of the twin gear wheel 17 and 39 to the opposite gear wheel 41 and, by way of the shifting cone 45 and the shift sleeve 46, to the output shaft 40.

By omitting the center differential or the transfer transmission 7 and replacing it with a connection clutch, the overall transmission unit can be considerably shortened. This embodiment is described in FIG. 3. In this case, the transmission part (transmission 4) with its input shaft 11 and its secondary shaft 26 and the responding gear wheel pairs remains the same.

In the case of this embodiment of the indirect manual transmission with the reduction gear, the shift sleeve 47a of the reduction gear 6a is disposed on the pinion shaft 57a of the front axle drive in a non-rotatable but axially displaceable manner. The pinion shaft is therefore formed by the output shaft 40a of the reduction gear 6a. As in the previous embodiment, the shift sleeve 47a can be shifted either with the fixed wheel 31 of the 5th gear or with the opposite gear wheel 41a disposed as a loose wheel on the pinion shaft 57a. The pinion shaft 57a or the output shaft 40a is non-rotatably connected with the clutch disk 60 of a connection clutch 61. The clutch disk 60 can be coupled with the driving dog disk 62 which is non-rotatably arranged on the connection shaft 53a aligned with the pinion shaft 57a. As in the previous embodiment, the connection shaft 53a is connected with the pinion shaft 54 of the rear axle differential 10 by way of the cardan shaft 9.

By way of the pinion shaft 57a, the manual transmission or the reduction gear is continuously connected in the shifted condition with the front axle differential. The drive of the rear axle by way of the rear axle differential can be optionally connected by way of the connection clutch 61.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Indirect manual transmission for motor vehicles having cross-country mobility, comprising:

an input shaft;

a secondary shaft which is driven by said input shaft;

a plurality of gear wheels, comprising fixed wheels and loose wheels, said loose wheels being disposed on said input and secondary shafts so as to be rotatably mounted on said shafts such that they may be selectively fixed to said shafts;

a shiftable cross-country reduction stage arranged downstream and integrated in a transmission unit such that a power flux first passes through a main transmission and then the reduction stage;

wherein a first loose wheel of said input shaft is constructed as a twin gear wheel and is operable as a countershaft for said cross-country reduction stage.

2. Indirect manual transmission according to claim 1, wherein the first loose wheel constructed as the twin gear wheel is assigned to an upper speed of the manual transmission.

3. Indirect manual transmission according to claim 1, wherein the first loose wheel constructed as the twin gear wheel is assigned to a highest speed of the manual transmission.

4. Indirect manual transmission according to claim 1, further comprising:

two axle drives;

wherein the manual transmission is connectable with said two axle drives, in that said shafts of the transmission are arranged in a longitudinal direction of the motor vehicle, and in that a pinion shaft of an axle drive is guided in said secondary shaft constructed as a hollow shaft.

5. Indirect manual transmission according to claim 1, wherein an output shaft of said cross-country reduction stage is constructed as a hollow shaft through whose bore a pinion shaft of an axle drive is guided.

6. Indirect manual transmission according to claim 1, wherein a center differential is arranged in a path of a power flux behind said cross-country reduction stage, and has an output to a front axle and a rear axle, said outputs being coaxial.

7. Indirect manual transmission according to claim 1, wherein a shifting element of said cross-country reduction stage is constructed as a synchronizing shift sleeve and is non-rotatably displaceable on an output shaft of said reduction stage.

8. Indirect manual transmission according to claim 1, wherein an axle drive is continuously driven in a shifted condition of the transmission and of the reduction stage, and in that a second axle drive is couplable to the first axle drive by way of a connection coupling.

9. Indirect manual transmission for motor vehicles having cross-country mobility, comprising:

an input shaft;

a secondary shaft which is driven by said input shaft;

a plurality of gear wheels, comprising fixed wheels and loose wheels, said loose wheels being disposed on said input and secondary shafts so as to be rotatably mounted on said shafts such that they may be selectively fixed to said shafts;

a shiftable cross-country reduction stage arranged downstream and integrated in a transmission unit such that a power flux first passes entirely through a main transmission and then the reduction stage;

wherein a first loose wheel of said input shaft is constructed as a twin gear wheel and is operable as a countershaft for said cross-country reduction stage.

* * * * *